Patented Aug. 18, 1925.

1,550,280

UNITED STATES PATENT OFFICE.

FRED POST, OF PEEKSKILL, NEW YORK.

ALUMINUM WELDING COMPOUND.

No Drawing.   Application filed June 17, 1922.   Serial No. 569,149.

*To all whom it may concern:*

Be it known that I, FRED POST, a citizen of the United States, and resident of Peekskill, in the county of Westchester and State of New York, have invented a certain new and useful Aluminum Welding Compound, of which the following is a specification.

The object of my invention is the production of a flux for welding aluminum and its alloys.

Results are obtained from a composition of aluminum on one side and sodium potassium and lithium on the other side, as kations, and chlor and fluor as anions, in such combinations that the aluminum-atoms are not greater than the alkali atoms. If the amount of aluminum is in excess in the composition the mixture of the salts is decomposed by the higher heat required by the aluminum.

The powder contains between 35–45% of potassium-chloride, between 25–35% of sodium-chloride, between 15–25% of lithium-chloride, between 1–10% of potassium-sulphate and 5–10% of kryolite (sodium-aluminum-fluoride ($Na_3AlF_6$)).

Potassium chloride, sodium chloride and lithium chloride are the so-called alkali chlorides, sodium fluoride is the so-called fluor salt and aluminum sulphate is the so-called aluminum-salt. Instead of aluminum sulphate, another salt, as per example aluminum chloride can be used.

The manufacture of this welding powder is simple. The powders, all together, are placed in an air tight mixing machine, because the sodium chloride, and especially the lithium chloride are hygroscopic, and their absorption of moisture causes the mixture to become lumpy and give bad welding results. The mixing machine is revolved about one hour. The powder is packed in air-tight tin cans ready for use.

The mixture described becomes complete and its efficiency is increased when potassium sulphate is added thereto, as that addition brings the melting point of the combined powders more closely to that required for the aluminum and its alloys; one result of which is, the elimination of rough seams. The specific weight is lightened by a high content of lithium-chloride, which adds to the fluidity and penetrating power of the melted powder. This welding powder further possesses the power of turning into a lightly protective covering of any oxide of aluminum which may form, through a chemical transformation by the help of the aluminum salts, as per example, aluminum sulphate, and prevents the influx of the oxide into the places that are being welded together. Should this not be prevented the strength of the welding is imperiled.

I claim:

1. The aluminum welding powder comprising aluminum salts, a mixture of alkali chlorides, fluor-salts and potassium-sulphates as herein set forth.

2. An aluminum welding powder containing approximately the following proportions: 36.65 per cent of lithium-chloride, 30.40 per cent of potassium-chloride, 22.65 per cent of sodium-chloride, 8.20 per cent of potassium-sulphate, and 2.10 per cent of kryolite.

DR. FRED POST.